May 23, 1967  SADAKUNI SHIMADA  3,321,720
CIRCULAR WAVEGUIDE TE$_{On}$ MODE FILTER
Filed Sept. 13, 1965  4 Sheets-Sheet 1

TO THE MODE FILTER

INVENTOR.
Sadakuni Shimada
BY
H. Edward Mestern

United States Patent Office 3,321,720
Patented May 23, 1967

3,321,720
CIRCULAR WAVEGUIDE $TE_{0n}$ MODE FILTER
Sadakuni Shimada, 330 Koigakubo, Kokubunji-shi, Tokyo-to, Japan
Filed Sept. 13, 1965, Ser. No. 491,486
Claims priority, application Japan, Nov. 9, 1961, 36/40,028
18 Claims. (Cl. 333—98)

This application is a continuation-in-part of prior application Ser. No. 427,764, filed Jan. 25, 1965, in the name of Sadakuni Shimada, and entitled "Circular Waveguide $TE_{0n}$ Mode Filter," and now abandoned.

This invention relates to signal transmission in high-frequency bands such as the millimeter wave band, and more particularly it relates to a new circular waveguide $TE_{0n}$ mode filter with highly desirable characteristics.

In low-loss, long-distance transmission of signal waves in a high-frequency band such as the millimeter wave band, in general a $TE_{01}$ mode in a circular waveguide in which the loss decreases with increasing frequency is used.

However, since such a circular waveguide as mentioned above which is generally used for low-loss transmission of millimeter waves has an inner diameter which is greater than the wavelength, so-called spurious modes in addition to the above-mentioned $TE_{01}$ mode wave necessary for signal transmission are also readily generated and are caused to be transmitted. Consequently, these spurious mode waves cause a loss in the $TE_{01}$ mode wave, and signal transmission of the instant type has, heretofore, been accompanied by various difficulties such as the generation of delay distortion in the transmitted signal.

Accordingly, it is necessary, in order to accomplish good transmission, to remove such spurious or undesired mode waves by means of a suitable mode filter. Conventional mode filters used hitherto, however, have had disadvantages which will be described in greater detail hereinafter.

It is an object of the present invention to provide a new $TE_{0n}$ mode filter of relatively simple construction wherein the above-mentioned disadvantage of conventional mode filters is eliminated, and which has highly desirable characteristics as will be apparent from the description presented hereinafter.

It is a specific object of the present invention to provide a new $TE_{0n}$ mode filter by means of which it is possible to attenuate a circular electric wave $TE_{0n}$ mode (where $n$ is 2 or higher integer) which does not possess an axial conduction current at the guide wall, without imparting any effect on the main $TE_{01}$ mode.

The foregoing objects have been achieved by the present invention which, briefly described, provides a $TE_{0n}$ mode filter comprising a sector waveguide, or a circular waveguide consisting of at least one radially divided cylinder, having an arcuate surface part and a planar surface part which has, at positions where the absolute value of the axial magnetic field component of a wave of a mode to be transmitted becomes smaller than the absolute value of the axial magnetic field component of a spurious mode wave, a plurality of short through-slits alined in rows parallel to the axis of the waveguide or long thin through-slits parallel to the axis of the waveguide and a wave attenuation means disposed on the outer side of the said planar part, at least over the portion having the said short slits or the said long thin slits.

The nature, principle, and details of the invention will become more apparent by reference to the following description when it is read in conjunction with the accompanying drawing, in which like parts are designated by like reference numerals, and in which.

Figure 6:
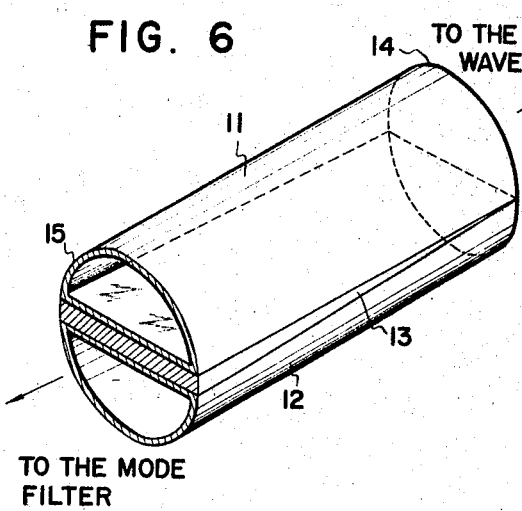
Figure 7:
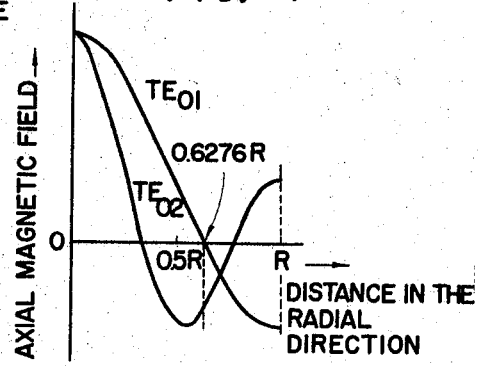
Figure 8:
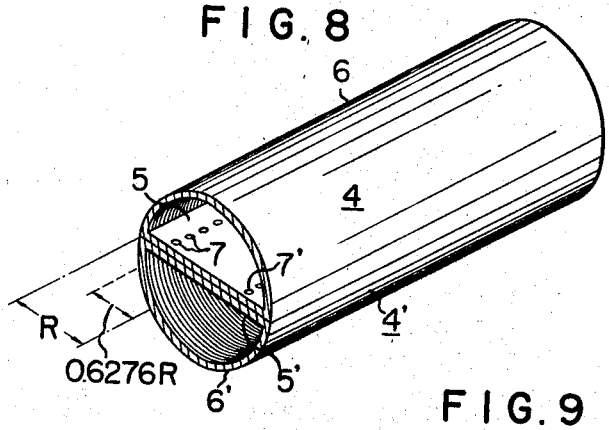
Figure 9:
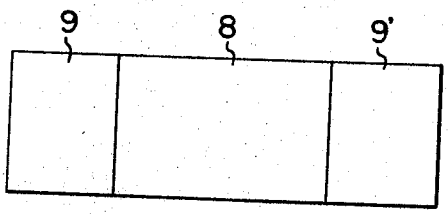
Figure 10:
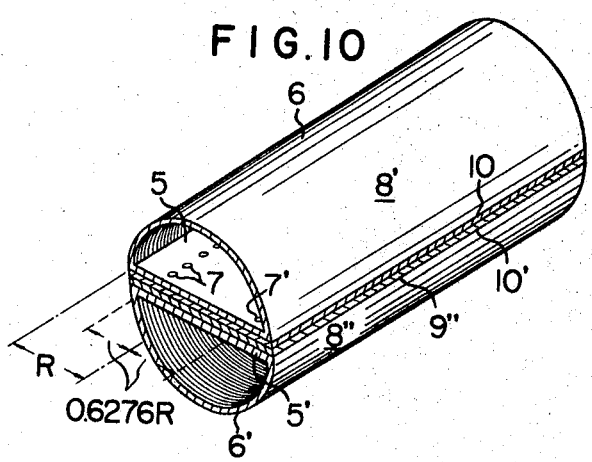
Figure 11:
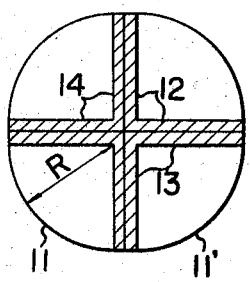
Figure 12A:
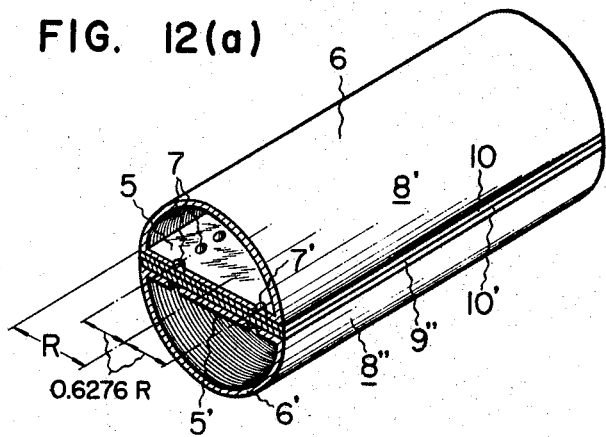
Figure 12B:
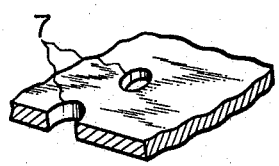
Figure 13A:
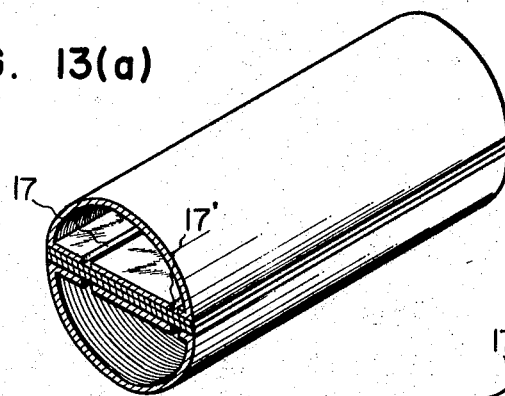
Figure 13B:
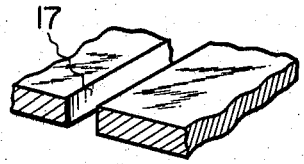
Figure 14A:
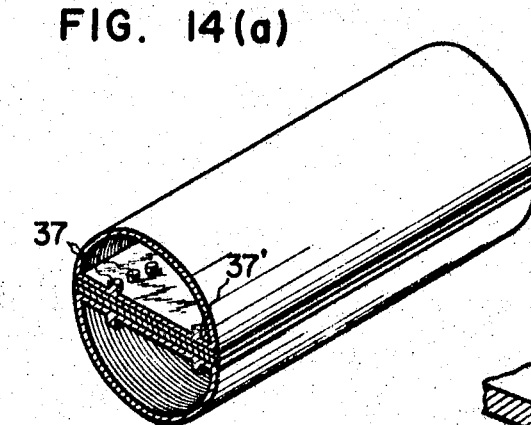
Figure 14B:
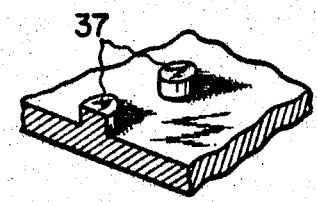
Figure 15A:
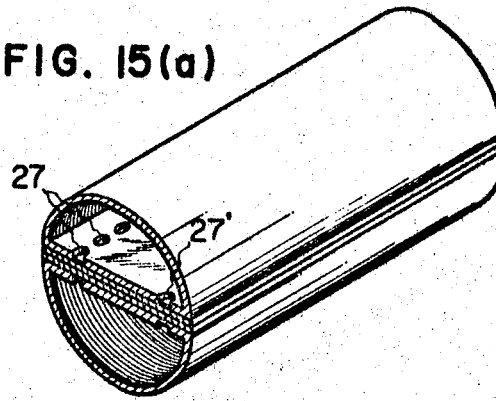
Figure 15B:
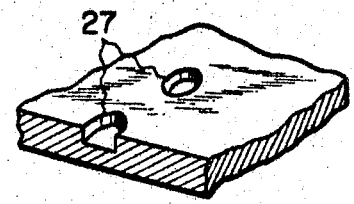

FIG. 6 indicates an example of the structure of a tapered bifurcated guide which connects the mode filter of the present invention and an ordinary circular waveguide for transmitting $TE_{01}$ mode wave as applicable to the present invention;

FIG. 7 is a graphical representation showing characteristic curves, presented for the purpose of describing the present invention;

FIGS. 8 and 10 are perspective views showing the constructions of two different embodiments of the invention;

FIG. 9 is a diagram indicating the arrangement of another embodiment of the invention;

FIG. 11 is a diagrammatic cross-sectional view showing still another embodiment of the invention;

FIGS. 12(a) and (b) show the position and configuration of the slits, as in FIG. 8, in greater detail;

FIGS. 13(a) and (b) show rows of long thin slots in lieu of slits and their configuration, as e.g., in FIG. 8;

FIGS. 14(a) and (b) show rows of projections in lieu of slits and their configuration, as e.g., in FIG. 8; and FIGS. 15(a) and (b) show position and configuration of indentions in lieu of slits, as e.g., in FIG. 8.

Figure 1:
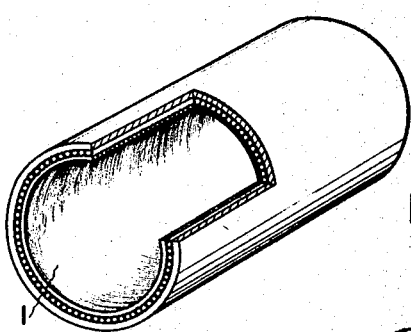
FIG. 1 is a perspective view, with a portion cut out, of a conventional mode filter, presented for the purpose of comparison.
Figure 2:
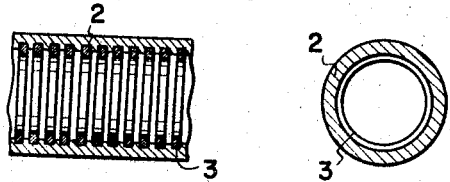
FIG. 2 shows a longitudinal section and a cross section of another conventional mode filter, also presented for the purpose of comparison.

Conventional mode filters have been adapted to impart attenuation with respect to a mode having an axial conduction current component at the cylinder wall as in, for example, the helix waveguide with closely wound insulated copper wire 1 shown in FIG. 1 or the spaced-disk type waveguide with ring-shaped conductors 3 disposed in side-by-side alinement with a minute, constant spacing therebetween on the inner surface of an insulator tube 2 as shown in FIG. 2, and have not been adapted to impart attenuation with respect to spurious circular electric $TE_{0n}$ mode (where $n$ is 2 or a higher integer).

The object of rectifying this deficiency has been achieved in the mode filter according to this invention, wherein, without imparting attenuation with respect to a $TO_{01}$ mode, a high magnitude of attenuation can be imparted with respect to the spurious circular electric $TE_{0n}$ mode (where $n$ is 2 or a higher integer).

In the following description of particular embodiments of this invention, particular attention is paid to the $TE_{02}$ mode, the cut-off wavelength of which is nearest the $TE_{01}$ mode among the spurious circular electric $TE_{0n}$ modes, and which, moreover, is most readily generated within the waveguide, and the embodiments are adapted to cause the attenuation of the said $TE_{02}$ mode. It will be obvious, however, that the same idea can be reduced to practice with respect to one of the mode waves of a circular electric wave which does not possess an axial conduction current.

Figure 4:
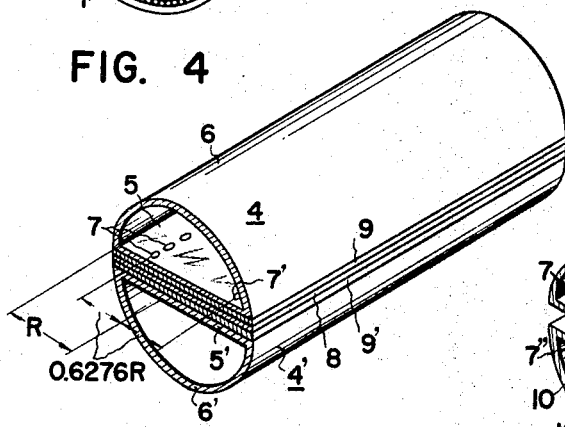
FIGS. 4 and 5 are perspective views showing different embodiments of the mode filter according to the present invention.

Referring to FIG. 4, the principal structure of the embodiment of the invention shown therein comprises two semicircular waveguides 4 and 4' having equal radii and consisting of planar part 5 and 5' and semicircular, arcuate parts 6 and 6', respectively. The said planar part 5 is provided with rows of slits 7 and 7' formed therein in the axial direction of the waveguide, each slit being disposed at a position which is at a distance of 0.6276R (where R is the radius of the semicircular waveguide) from the centerline of the semicircular waveguide. Although not shown, the said planar part 5' is similarly provided with slits of the same size, spacing, and disposition as is the planar part 5. In assembled state, the two semicircular waveguides are so disposed that their planar parts 5 and 5' are in parallel and mutually opposed juxtaposition with a laminated group consisting of a lossy layer 8 between dielectric layers 9 and 9' interposed therebetween. The function of the lossy layer 8 is to absorb and attenuate waves leaking through the aforesaid slits. Such a waveguide constructed with a plurality of divided semicircular or fan-shaped waveguides and designed to transmit circular electromagnetic wave is hereinafter called a composite circular waveguide.

When a signal wave, $TE_{01}$ mode and a spurious $TE_{02}$ mode are transmitted to a composite circular waveguide of the above-described construction, the distribution characteristics in the radial direction of the axial magnetic fields of the said two modes are as indicated in FIG. 7, and, in the $TE_{01}$ mode, the axial magnetic field component becomes zero at the position of 0.6276R from the center of the semi-cylinder. Accordingly, since the $TE_{01}$ mode, at the said position, does not have a current component in the radial direction, transmission loss due to the afore-mentioned slits disposed at this position and the lossy layer 8 is not incurred.

On the other hand, since the $TE_{02}$ mode has an axial magnetic component at the said position as indicated in FIG. 7, it has a current component in the radial direction at the said position. Consequently, the $TE_{02}$ mode leaks through the slits to the guide wall and then reaches the lossy layer 8 by way of the dielectric layer 9 or 9', whereby it is absorbed and attenuated.

In order to transfer the $TE_{01}$ mode wave into the above-mentioned semicircular waveguides, a tapered bifurcated guide as shown in FIG. 6 can be used. In FIG. 6, the reference numerals 11 and 12 designate semicircular waveguides and 13 represents a tapered member interposed between the said semicircular waveguides. When one end 14 of the tapered bifurcated guide is connected to a circular waveguide for transmitting $TE_{01}$ mode and the other end 15 thereof is connected to a mode filter as shown in FIG. 4 or 5 of the accompanying drawing, the electromagnetic wave of $TE_{01}$ mode transmitted from the side of 14 is made to be transmitted gradually to the mode filter.

Thus, by the above-described construction, it is possible to impart a high magnitude of attenuation with respect to a spurious wave such as, for example, a $TE_{02}$ mode, without imparting any effect relating to transmission, whatsover, with respect to the $TE_{01}$ mode.

Figure 5:
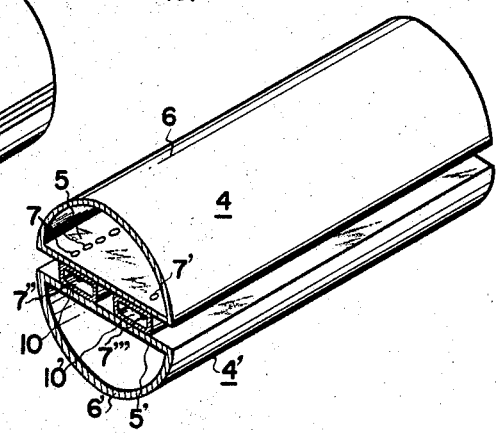

FIG. 5 illustrates another embodiment of the invention, in which the configuration and dimensions of the semicircular waveguides 4 and 4' and the positions of the slits 7, 7', 7'', and 7''' are the same as those of the embodiment shown in FIG. 4. In the embodiment of FIG. 5, however, rectangular waveguide 10 and 10' are interposed between the opposed, planar parts 5 and 5' of the semicircular waveguides 4 and 4' and so adapted that a spurious wave leaking through the said slits 7 through 7''' is led to the said rectangular waveguides 10 and 10' and is absorbed by means of, for example, lossy material, inserted in the paths of the said rectangular waveguides 10 and 10'.

Although in the foregoing disclosure only the case of a circular waveguide consisting of two semicircular halves has been described, the present invention is not to be limited to such a halved cylinder construction, but is applicable also to a circular waveguide radially divided in any desired manner.

The leakage path for the aforementioned spurious wave may be formed by rows of slits in the axial direction of the cylinder as afore-described or by long thin slits in the axial direction.

Figure 3:
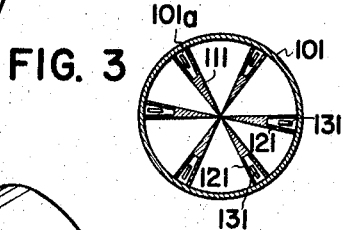
FIG. 3 shows a sectional view of the main structure of still another conventional mode filter.

It should be mentioned herein for the sake of comparison that there exists U.S. Patent No. 3,010,088 (Kahn) which is considered to be somewhat pertinent to the present invention. However, the prior art, as shown in FIG. 3, presents a perfect circular waveguide 101, in which a plurality of metallic vanes 111 having wedge-shaped cross-section are disposed radially on the center line of the circular waveguide and a small body of lossy material 131 is housed in the hollow inside the thick portion of each of the metallic vanes. In such structure of a circular waveguide, the following disadvantages inevitably exist. It is extremely difficult to secure satisfactorily the contact portion between the inner periphery of the circular waveguide 101 and the radial metallic vane 111 inserted in the waveguide. Even if this portion is jointed by welding, if welding is not carried out in a highly skillful manner, it easily causes irregular surfaces on the welded portion, which give rise to undesirable mode waves. As is understandable from FIG. 3, it is not so easy to connect in a complete manner thinly tapered ends of the wedge-shaped metallic vanes 111 extending from the inner periphery of the waveguide 101 at the portion where said vanes are concentrated at the center axis of the waveguide 101. If the method of connection is not perfect, it causes a resistance loss, and, moreover, even if they can be connected by means of welding or a similar method, if there occurs any irregular surface due to welding, it inevitably brings about generation of undesirable mode waves. Furthermore, a difficult problem exists, i.e., how to join the tapered ends of said metallic vanes at the center axis of the circular waveguide 101. If any discrepancy occurs in joining the said tapered ends, it causes undesirable mode waves. Still further, the U.S. patent, as indicated in FIG. 3, requires formation of a hollow, or a small waveguide $101_a$, inside the metallic vane 111 for accommodating a small body of lossy material 131. Also, when it is desired to widen the contact area between the vane portion 111 and the inner periphery of the waveguide 101 for the purpose of securing sufficient connection, the breadth of the vane 111 must be made considerably wider. However, when the breadth of the vane is widened, the space of the waveguide to be reserved for transmitting a $TE_{01}$ mode wave becomes considerably narrower by these broadened metallic vanes with the result that the space to be reserved for transmitting $TE_{01}$ mode becomes small and the $TE_{01}$ mode wave is subjected to large losses.

Contrary to the prior art, having the above-mentioned disadvantages, the waveguide of the present invention is constructed with a plurality of fan-shaped or sector waveguides each of which is composed of an arcuate part and a planar part being integrated beforehand in such a configuration as a semicircular waveguide, a quadrant waveguide, etc., a layer of lossy material is disposed on the outer side of the planar part having the rows of short slits, and the planar part of said sector waveguide and that of another sector waveguide are mutually opposed so that the layer of the lossy material is interposed therebetween. Consequently, the waveguide can be very easily constructed, and the drawbacks which are encountered in the prior art are non-existent, as becomes evident from the following.

Since the present invention uses a sector waveguide which is composed of a planar part and an arcuate part being assembled integrally, no wedge-shaped metallic vane is required to be inserted as in Kahn. Consequently, there is no necessity of welding or other connecting, as mentioned in the preceding paragraph and therefore no ensuing disadvantages. Since the waveguide according to the present invention is so designed that a pair of semicircular waveguide parts which are accurately manufactured beforehand are made to affix each other at their planar surfaces, the working accuracy of the complete body can be maintained at a high degree. Accordingly, there occurs no serious problem as in Kahn's patent, such as that the thinly tapered ends of the wedge-shaped metallic vanes need be concentrated at the center line of the waveguide with highest accuracy, or that the tapered ends joined at the center line of the circular waveguide must be connected in a perfect manner. Furthermore, in the present invention, as there is no necessity of inserting any foreign material in the predetermined transmission wave path, the transmission space for $TE_{01}$ mode wave need not be small, hence there is no transmission loss of $TE_{01}$ mode waves. On the other hand, as the circular waveguide of Kahn contains a large volume of foreign materials inserted therein, there arise various inconveniences and disadvantages as mentioned in the foregoing paragraphs.

In the foregoing explanations, slits or slots have a function of attenuating spurious modes of waves. On the other hand, however, those slits or slots also possess the capability of converting a mode into other mode of wave.

The present invention, on the basis of the above-mentioned function, contemplates the provision of a mode filter of the same type as has been described hereinbefore which gives large attenuation with respect to higher modes of circular electric waves $TE_{0n}$ (where $n$ is 2 or a higher integer), while it does not effect any attenuation with respect to a desired mode of a transmission wave $TE_{01}$. For other means having the function of mode conversion, there are, for example, small convex or concave shapes etc. which attain the same effect as the above-mentioned slits or slots.

In one embodiment of the invention as shown in FIG. 8, the mode filter consists of semicircular helix waveguide tubes 4 and 4', both having the same radius, respectively consisting of plane walls 5 and 5' and arcuate walls 6 and 6' of helix waveguide, and being joined with flush contact of their plane walls 5 and 5'. The plane walls 5 and 5' are provided with two long rows of mode conversion means such as, for example, long thin slits (FIGS. 13(a) and (b)), projections (FIGS. 14(a) and (b)), or indentations (FIGS. 15(a) and (b)), said rows being positioned on opposite sides of the semicircular waveguide center line at a distance of 0.6276R therefrom (R being the radius of the semicircular waveguide. Although not shown in FIG. 8, mode conversion means of the same kind and arrangement as the means 7 and 7' are provided also in the plane wall 5'.

The following description of embodiments of the invention is set forth with particular attention to the $TE_{02}$ mode wave, which among the higher modes of circular electric waves $TE_{0n}$, has a cut-off wavelength closest to the $TE_{01}$ wave, and which, moreover, is generated most readily in the waveguide. It will be obvious, however, that the same concepts can be applied also with respect to waves of other modes.

In the case when a signal wave $TE_{01}$ and a spurious wave $TO_{02}$ are transmitted to a waveguide of the construction described above in conjunction with FIG. 8, the distribution in the radial direction of the axial magnetic field of both of these modes is as indicated in FIG. 7, wherein the axial magnetic field component becomes zero at the position where the $TE_{01}$ wave is 0.6276R from the semicircle center.

Consequently, since the $TE_{01}$ wave does not have a radial component of conduction current at the above-said position, it is completely unaffected by the mode conversion means 7 and 7' alined at this position. On the other hand, since the $TE_{02}$ wave, as indicated in FIG. 7, has an axial magnetic field component at this position, it is subjected at this position to the disturbing action due to the mode conversion means and is converted into waves of various other modes. However, since, in this embodiment of the invention, the arcuate walls of the semicircular waveguide are formed from semicircular parts of a helix waveguide or a spaced-disk type waveguide, the spurious mode waves which have been produced in the aforedescribed manner by the conversion of the $TE_{02}$ wave, and which have conduction current components in the axial direction at the waveguide wall, can accordingly be removed. Therefore, it is possible to transfer the objective $TE_{01}$ mode wave in a highly efficient manner.

As mentioned above, the $TE_{02}$ wave is converted by the mode conversion means into waves of other modes, but, in addition, there is also one portion thereof which is reflected. However, it is possible to cause the reflected $TE_{02}$ wave to be canceled by, for example, appropriately selecting the spacing pitch of the slits of the mode conversion means aligned in long rows in the axial direction. Furthermore, although in the construction described above, the mode conversion means are provided on the plane walls of the semicircular helix or space-disk waveguide, an alternative arrangement as indicated in FIG. 9 may be resorted to. In this alternative arrangement, a semicircular waveguide 8 having an ordinary tube wall configuration which is not of the helix type or spaced-disk type is used as a semicircular waveguide tube and provided in front and rear (or on one end) thereof with helix or spaced-disk type waveguide tubes 9 and 9'. By this arrangement, the spurious mode waves which have been produced by the conversion of the $TE_{02}$ mode wave in the waveguide 8, and which have a conduction current component in the axial direction at the tube wall, are removed by the waveguides 9 and 9'.

In another embodiment of the present invention as shown in FIG. 10, the mode filter consists of two semicircular waveguide tubes 8' and 8" having the same radius and respectively consisting of plane walls 5 and 5' and arcuate walls 6 and 6'. The plane wall 5 is provided with slits 7 and 7' in two long rows alined in the tube axial direction at positions on opposite sides of and at a distance of 0.627R (where R is the radius of the semicircular tubes) from the tube center line. The semicircular waveguide tubes 8' and 8" are mutually joined along their plane walls over a laminated combination of a lossy layer 9 sandwiched between dielectric layers 10 and 10' interposed therebetween. The lossy layer 9" is used for the purpose of absorption and attenuation of waves leaking through the aforesaid slits.

When a $TE_{01}$ wave and a spurious mode $TE_{02}$ wave are transferred to a waveguide of the abovedescribed construction, since the $TE_{02}$ wave has an axial magnetic field component at a position at a distance of 0.627R from the center of the semicircular tube and, at this position, has a radial component of conduction current, a portion of this component is subjected to disturbance due to the slits and is converted into waves of various other modes. The spurious mode wave which has a conduction current component in the tube axial direction can be removed by the walls 6 and 6' corresponding to a helix waveguide or a spaced-disk type waveguide, similarly as in the aforedescribed embodiment of the invention. Further, in this case, another portion of the $TE_{02}$ wave passes through the slits and, by way of the dielectric material 10 and 10', reaches the lossy layer 9", where it is absorbed and attenuated. Therefore, in a mode filter of this construction, the removal of the $TE_{02}$ wave is even more effective.

On the other hand, since the $TE_{01}$ wave does not have a radial component of conduction current at the above-stated position, there is no transfer loss at this position due to the aforesaid alined slits and the lossy layer. Instead of forming the arcuate walls of the semicircular waveguide tubes as a helix or spaced-disks as in the above-described example, ordinary waveguide tubes may be used, and, at the same time, one or two waveguide tubes such as helix waveguide tubes may be provided in front and rear thereof.

Although the foregoing description relates to semicircular waveguide tubes, the invention can be applied also to circular waveguide or sector waveguides having cross sections which are divided into four sectors as shown in FIG. 11 or any desirable number of sectors. When a sector waveguide mode filter is used, in order to connect it to an ordinary circular waveguide tube, a tapered waveguide tube of known type may be used. The divided waveguide tube shown in FIG. 11 consists of sector tubes having arcuate walls 11, 11', etc., and plane walls, dielectric layers 13, and lossy layers 12 sandwiched between the dielectric layers 13. The plane walls are provided with slits 14 disposed at positions at a distance of 0.6276R (where R is the radius of the arcuate walls) from the center of the divided waveguide.

Furthermore, for the mode conversion means to impart disturbance to spurious waves such as the aforementioned $TE_{02}$ wave and to convert such waves into waves of various other modes, indentations or slits may be alined in long rows in the tube axial direction, or, alternatively, long thin grooves or long thin slits may be provided in the tube axial direction.

Although the above said mode conversion means has been described with respect to only its provision at positions 0.6276R from the center, it may, in general, be provided in positions such that the axial magnetic field component of the $TE_{01}$ mode wave becomes smaller than the axial magnetic field component of the spurious mode $TE_{0n}$ wave (where $n$ is an integer 2 or greater) in order to attain the objects of the invention, as will be apparent from FIG. 7.

Although this invention has been described with respect to particular embodiments thereof, it is not to be so limited as changes and modifications may be made therein which are within the full intended scope of the invention, as defined by the appended claims.

What I claim is:

1. An electromagnetic wave $TE_{0n}$ mode filter which comprises, in combination: a composite circular waveguide constructed with a plurality of single bodies of sector waveguides, each being composed of an arcuate part and a planar part both of which are integrated beforehand, the said single bodies of sector waveguides being so assembled that the said planar parts of the sector waveguides are made to oppose juxtaposition with a substantially equal space gap; a plurality of short slits provided in rows parallel to the axis of the said waveguide on said planar part at positions where the absolute value of the axial magnetic field component of a wave of a mode to be transmitted through this waveguide becomes smaller than the absolute value of the axial magnetic field component of an undesired mode wave; and a wave attenuation part formed between the said opposed planar parts, at least on the outer side of the said planar part having the said short slits.

2. An electromagnetic wave $TE_{0n}$ mode filter according to claim 1 wherein the said plurality of short slits are used as the mode conversion means.

3. An electromagnetic wave $TE_{0n}$ mode filter which comprises, in combination: a composite circular waveguide constructed with a plurality of single bodies of sector waveguides, each being composed of an arcuate part and a planar part both of which are integrated beforehand, the said single bodies of sector waveguides being so assembled that the said planar parts of the sector waveguides are made to oppose juxtaposition with a substantially equal space gap; a plurality of long thin slits provided in rows parallel to the axis of the said waveguide on said planar part at positions where the absolute value of the axial magnetic field component of a wave of a mode to be transmitted through this waveguide becomes smaller than the absolute value of the axial magnetic field component of an undesired mode wave; and a wave attenuation part formed between said opposed planar parts, at least on the outer side of the said planar part having said long thin slits.

4. The electromagnetic wave $TE_{0n}$ mode filter according to claim 3, wherein the said plurality of long thin slits are used as the mode conversion means.

5. An electromagnetic wave $TE_{0n}$ mode filter which comprises, in combination: a composite circular waveguide constructed with a plurality of single bodies of sector waveguides, each being composed of an arcuate part and a planar part both of which are integrated beforehand, the said single bodies of sector waveguides being so assembled that the said planar parts of the sector waveguides are made to oppose juxtaposition with a substantially equal space gap; a plurality of short slits which are provided in rows parallel to the axis of the said waveguide on said planar part at positions which are distant by 0.6276R, in the radial direction, from the center line of the said sector waveguide, R being the length of the radius of the said waveguide; and a wave attenuation part formed between the said opposed planar parts, at least on the outer side of the said planar part having said short slits.

6. An electromagnetic wave $TE_{0n}$ mode filter as defined in claim 5 wherein at least one rectangular waveguide provided with a wave attenuation layer is used as the wave attenuation part.

7. The electromagnetic wave $TE_{0n}$ mode filter according to claim 5, wherein the said plurality of short slits are used as the mode conversion means.

8. An electromagnetic $TE_{0n}$ mode filter which comprises, in combination: a composite circular waveguide constructed with a plurality of single bodies of sector waveguides, each being composed of an arcuate part and a planar part both of which are integrated beforehand, the said single bodies of sector waveguides being so assembled that the said planar parts of the sector waveguides are made to oppose juxtaposition with a substantially equal space gap; a plurality of long thin slits which are provided in rows parallel to the axis of the said waveguide on said planar part at positions which are distant by 0.6276R, in the radial direction, from the center line of the said sector waveguide, R being the length of radius of the said waveguide; and a wave attenuation part formed between the said opposed planar parts, at least on the outer side of the said planar part having the long thin slits.

9. An electromagnetic wave $TE_{0n}$ mode filter as defined in claim 8 wherein at least one rectangular waveguide provided with a wave attenuation layer is used as the wave attenuation part.

10. The electromagnetic wave $TE_{0n}$ mode filter according to claim 8, wherein the said plurality of long thin slits are used as the mode conversion means.

11. An electromagnetic wave $TE_{0n}$ mode filter comprising: a composite circular waveguide composed of a plurality of cylindrical sectors having planar parts, said planar parts being made to oppose juxtaposition with a substantially equal space gap; a dielectric layer disposed on the planar surface of each sector; a lossy layer interposed between the said dielectric layers; a plurality of slits provided in rows parallel to the axis of the said sectors, at positions distant by 0.6276R in the radial direction from the center line of the said sector waveguides.

12. An electromagnetic wave $TE_{0n}$ mode filter comprising: a waveguide composed of two semi-cylinders having planar parts, said planar parts being made to oppose juxtaposition with a substantially equal space gap; a dielectric layer disposed on the said planar surfaces of each semi-cylinder; a lossy layer interposed therebetween; a plurality of slits in the said planar surfaces in rows parallel to the axis of the said semi-cylinders at positions distant by 0.6276R in the radial direction from the center line of the said semi-cylinders, R being the length of the radius of the said semi-cylinders.

13. An electromagnetic wave $TE_{0n}$ mode filter comprising: two semi-cylindrical waveguides having planar parts, said planar parts being made to oppose juxtaposition with a substantially equal space gap; two additional rectangular waveguides interposed between the said semi-cylinders and parallel to each other, the planar surfaces of the semi-cylinders and the said additional rectangular waveguides being provided with a dielectric layer and a lossy layer interposed between the said dielectric layer covering the said planar surfaces and the additional waveguides; a plurality of slits in the said planar surfaces in rows parallel to the axis of the said semi-cylinders at positions distant by 0.6276R in the radial direction from the center line of the said semi-cylinders, R being the length of the radius of the said semi-cylinders; and a plurality of slits disposed in corresponding position in each of the said additional rectangular waveguides.

14. An electromagnetic wave $TE_{0n}$ mode filter which comprises, in combination: a composite circular waveguide constructed with a plurality of single bodies of sector waveguides, each being composed of an arcuate part and a planar part both of which are integrated beforehand, the said single bodies of the sector waveguides being so assembled that the said planar parts of the sector waveguides are made to oppose juxtaposition with a substantially equal space gap; and mode conversion means aligned in rows parallel to the axis of the said waveguide at positions on the said planar part which are 0.6276R in the radial direction from the center line of the said sector waveguide, R being the length of the radius of the said waveguide; and means to remove spurious mode waves produced by the said mode conversion means.

15. An electromagnetic wave $TE_{0n}$ mode filter according to claim 14, wherein the said mode conversion means is a row of small indentations.

16. An electromagnetic wave $TE_{0n}$ mode filter according to claim 14, wherein the said mode conversion means is a row of small projections.

17. An electromagnetic wave $TE_{0n}$ mode filter according to claim 14, wherein the arcuate part is formed by conductor walls of helical shape which are aligned in mutually insulated states.

18. An electromagnetic wave $TE_{0n}$ mode filter according to claim 14, wherein the arcuate part is formed by conductor walls of spaced-disc shape which are aligned in mutually insulated states.

References Cited by the Examiner
UNITED STATES PATENTS 3,010,088 11/1961 Kahn _____ 333—98
3,112,460 11/1963 Miller _____ 333—9

ELI LIEBERMAN, *Primary Examiner.*

R. F. HUNT, L. ALLAHUT, *Assistant Examiners.*